Sept. 27, 1966  H. N. BEHNKE  3,274,627
RAPID INDEXING OF PIPE THREADING APPARATUS
Filed Jan. 2, 1964  2 Sheets-Sheet 1
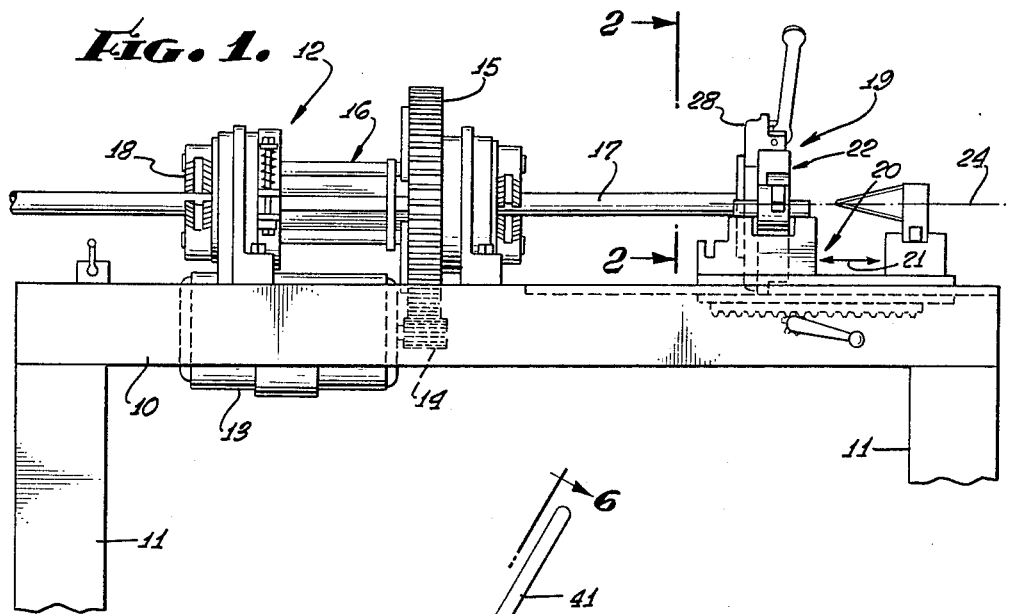
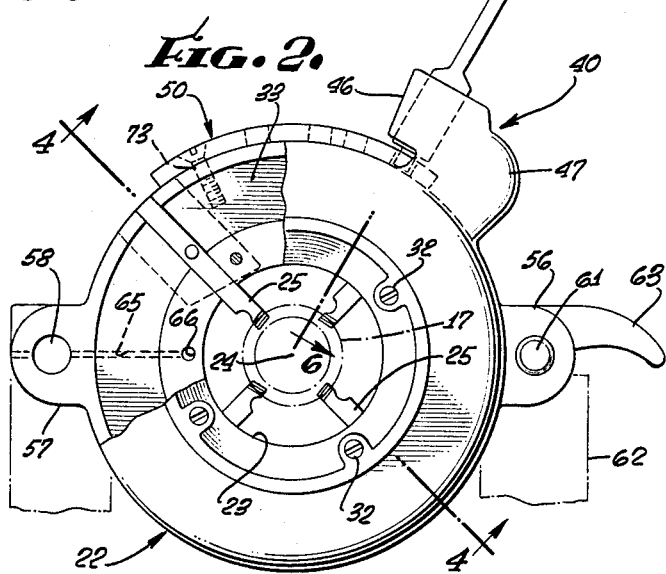
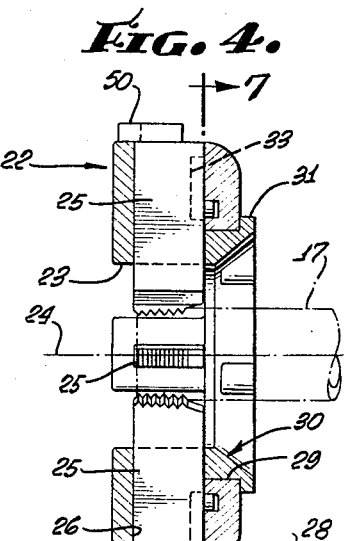
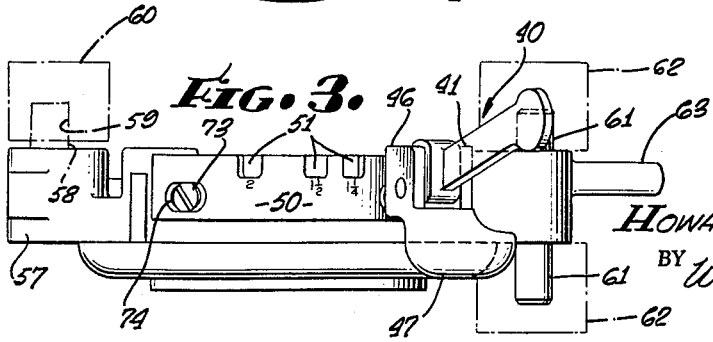
INVENTOR.
HOWARD N. BEHNKE
BY White & Haefliger
ATTORNEYS.

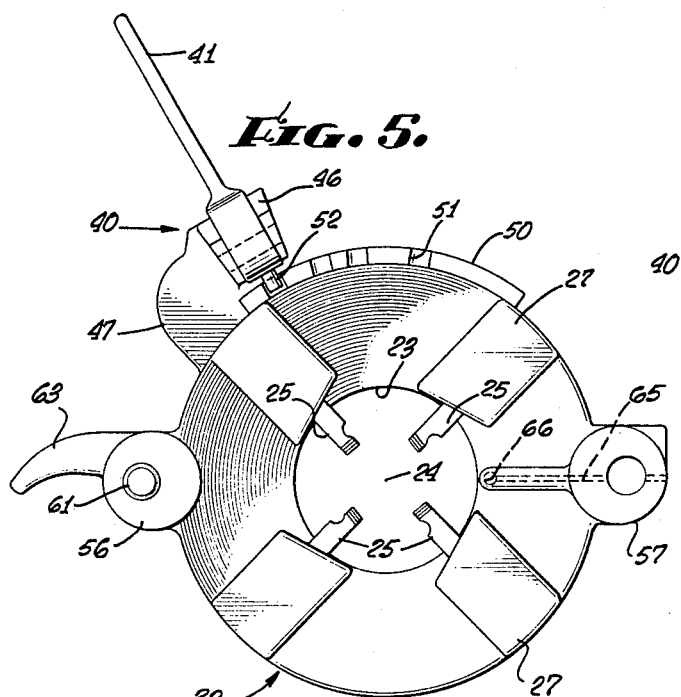
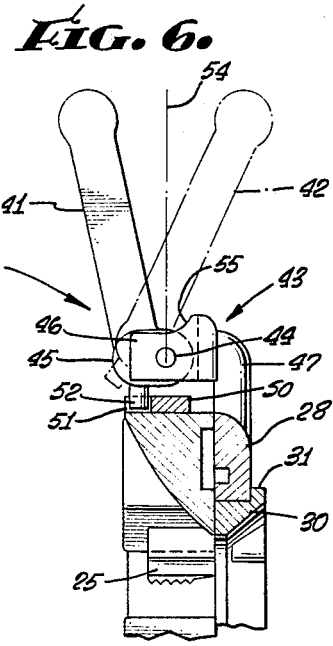
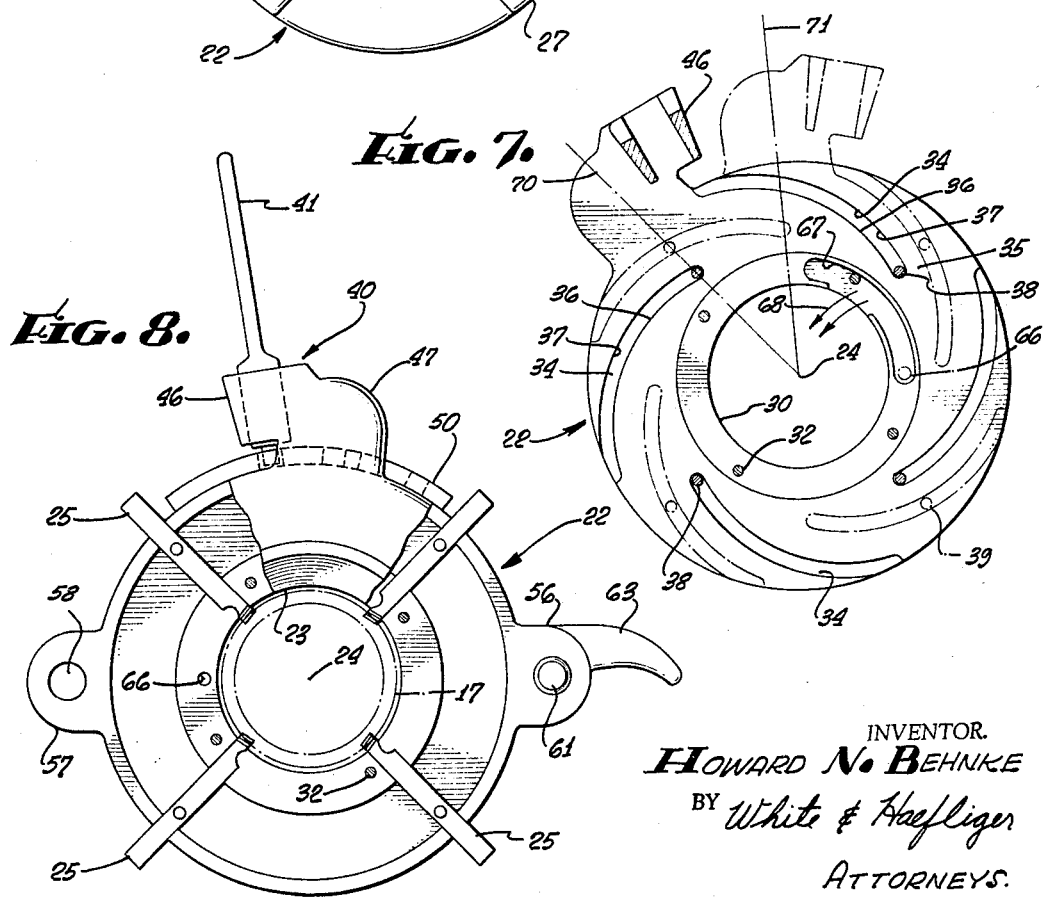

United States Patent Office 3,274,627
Patented Sept. 27, 1966

3,274,627
RAPID INDEXING OF PIPE THREADING APPARATUS
Howard N. Behnke, South San Gabriel, Calif., assignor to Collins Machinery Corporation, Monterey Park, Calif., a corporation of California
Filed Jan. 2, 1964, Ser. No. 335,022
4 Claims. (Cl. 10—96)

This invention relates generally to apparatus for cutting threads of different sizes on work such as pipe. More particularly, it concerns the indexing or adjusting of thread chasers to cut different size threads on rotating pipe, the unusual indexing apparatus being capable of performing, as well as accommodating the performance, of several interrelated functions as will be described.

Threading of pipe ends or the like is typically carried out while the pipe is clamped and rotated, or while the pipe is held stationary and the thread chasers are rotated relative to the pipe and in cutting engagement with it. Considering the necessity of cutting threads on pipe of different diameters and lengths, there is need for an unusually simple, versatile and easily manipulatable apparatus capable of rapidly indexing thread chasers to different diameter pipe for precision threading after the pipe has been fitted into the apparatus. It is a major object of the present invention to meet this need, in the unusual manner as will be brought out in detail.

The novel combination incorporating the easily manipulatable thread chaser indexing apparatus typically includes a pair of relatively rotatable members which form through openings to receive the pipe extending along a first axis. One of the members comprises a housing to carry thread chaser units, while the other member may comprise a body carrying camming for effecting inward advancement or outward retraction of the chaser units upon relative rotation of the members. Further, the indexing apparatus includes a latch with a handle carried to freely project outwardly away from the pipe axis at the exterior of the housing and body members, together with means including a pivot connecting the latch to one of the members for rocking about a second axis between primary and secondary positions. In primary position the one member such as the body may be freely rotated relative to the other member, to actuate the chasers, in response to high leverage force application to the handle in a direction about the pipe axis, whereas in secondary position of the handle relative rotation of the members is blocked. Also, the other member, such as the housing carries a series of latch engagement shoulders spaced about the pipe axis to be selectively engaged by the latch in its secondary position, the spacing of the shoulders being predetermined to correspond to the selected diameter work threads to be formed by the chasers. As a result, pipe of different diameters may be quickly received into the apparatus, the latch may be quickly swung about the latch or pipe axes with high leverage to effect inward advancement of the chasers to engage the pipe periphery, and the latch then may again be swung about its axis to lock the chasers in selected precision threading position relative to the pipe, the sequence of operations following each other quickly and positively with the entire control being kept at the easily manipulatable latch handle.

Other objects and advantages include the quickly releasable mounting of the assembly to keep the latch handle easily accessible by projecting generally upwardly throughout its swinging movement about both latch and pipe axes, the release feature of the mounting enabling quick removal of the assembly from mounted condition to fit over the end of long pipe; the provision of a clevis extending at the periphery of the housing and blocking the latch against rotation about the pipe axis relative to the body member; and the provision for overcenter action of the elongated latch handle whereby it tilts to one side of a vertical plane when fully engaged with the indexing notches or shoulders carried by the housing, and to the other side of the vertical plane when fully disengaged from the indexing notches.

These and other objects and advantages of the invention, as well as the details of an illustrative embodiment, will be more fully understood from the following detailed description of the drawings, in which FIG 1 is a side elevation showing the overall apparatus for mounting and rotating a pipe, together with the apparatus for precision threading the pipe;

FIG. 2 is an enlarged elevation, partly broken away, taken on line 2—2 of FIG. 1 to show the front of the threading apparatus;

FIG. 3 is a top plan view of the FIG. 2 threading apparatus;

FIG. 4 is a section taken on line 4—4 of FIG. 2;

FIG. 5 is a rear elevation view of the pipe threading apparatus;

FIG. 6 is a vertical elevation taken in section on line 6—6 of FIG. 2;

FIG. 7 is a section taken on line 7—7 of FIG. 4; and

FIG. 8 is a view like FIG. 2 but showing the elements in a different position.

Referring first to FIG. 1, the apparatus for mounting and rotating the pipe includes a table 10 supported on suitable legs 11, and carrying a drive generally indicated at 12. The latter includes an electric motor 13 driving a pinion gear 14, which in turn drives a large ring gear 15 which is supported for rotation by the structure 16. A pipe to be threaded is shown at 17 extending generally horizontally through the drive 12 to be gripped by suitable jaws 18 at opposite ends of the drive, and in response to rotation of the ring gear 15, there being suitable camming mechanism, not shown, to cause the jaws 18 to pivot inwardly to grip the pipe when the drive is operated.

Coming now to the subject matter with which the invention is particularly concerned, the assembly shown generally at 19 may be characterized as pipe threading apparatus mounted on a suitable carrier 20 which may be movable endwise along the table 10 as indicated by the arrows 21. As better seen in the remaining figures, the assembly 19 includes an annular housing member 22 forming a through opening 23 to receive the pipe 17 extending generally horizontally for rotation about the first axis 24. A series of thread chaser units seen at 25 is carried by the housing and disposed about the axis 24 for cutting presentment to the pipe, as best illustrated in FIGS. 2 and 8. The chaser units are shown as received within radial slots 26 cut in the bosses 27 which appear in the rear view FIG. 5. These slots 26 open toward the front side of the housing facing an annular body member 28 which likewise forms a pipe-receiving through opening 29 in registration with the housing opening 23.

The body member 28 is rotatable about the axis 24 while it is retained in the position shown in FIG. 4 by the housing member 22 and the retaining ring 30, a flange 31 of the latter overlapping the body member 28 at the forward side thereof. The ring 30 is in turn fastened to the housing 22 as by suitable fasteners 32 extending parallel to the axis 24. Frictional resistance to rotation of the body member 28 is reduced by relieving the face of the housing member at the annular location 33.

The body member 28 carries a series of cams spiraling about the axis 24 and located to effect simultaneous inward advancement, or outward retraction, of the chaser units 25 upon relative rotation of the body and housing members. For example, as seen in FIG. 7, the cams are formed by the spiral grooves 34 cut in the face 35 of the body at equal intervals about axis 24, the inner and outer shoulders 36 and 37 being adapted to have camming engagement with pins 38 which are integral with the chaser units 25. As viewed in FIG. 7, the pins 38 are in their innermost position, corresponding to the positions of the units 25 in FIG. 2 for threading small diameter pipe. Conversely, when the pins 38 are outwardly retracted to the broken line positions 39 in FIG. 7 the chaser units 25 are likewise retracted as, for example, is illustrated in FIG. 8.

In accordance with the invention, a latch including a handle is carried to freely project outwardly away from the axis 24 at the exterior of the housing and body members. For example, the latch 40 includes a handle 41 projecting upwardly, as seen in FIG 6, and means including a pivot connects the latch to the body member for rocking about a second axis between a primary position, as shown by the broken lines 42 in FIG. 6, and a secondary position seen in the full lines. More specifically, the connecting means comprises a clevis generally indicated at 43 having a pin 44 pivotally connecting the latch portion 45 to the clevis lugs 46, the latter being integrally attached at 47 to the body member upper portion.

As is clear from the drawings, the axis of the pivot 44 extends above and generally in rightangular relation to the pipe axis 24, so that rocking movement of the latch about the pivot axis occurs in a plane which is generally parallel to the axis 24. Accordingly, when the latch is rocked to the primary position shown in broken lines at 42 in FIG. 6, the body member may then be freely rotated relative to the housing member, and about the axis 24, in response to force application to the handle in a direction generally normal to the direction of handle rocking about the axis of the pivot 44. At this time, the clevis 43 acts to block the latch against rotation about the axis 24 and relative to the body member 28.

The invention also contemplates the provision of indexing means carried, as for example, by the housing member in forming a series of latch engagement shoulders spaced about the axis 24 to be selectively engaged by the latch in its secondary postion as seen in full lines at 41 in FIG. 6. Typically, the indexing means includes an arcuate plate 50 adjustably carried on the housing to present a series of notches 51 defining a series of shoulders spaced about the axis 24 to engage a latch dog 52 rocked into any selected notch in order to position the latch in secondary position. The spacing of the notches and plate shoulders is predetermined to correspond to the selected diameter of pipe threads to be formed by the chaser units 25, as best seen in FIG. 3. In this regard, it will also be seen that the latch handle has overall length much greater than the distance between the axis of the pivot 44 and the extended terminal of the latch dog 52 whereby a considerable rocking movement of the handle is necessary to disengage the dog from the notch. Also, the handle in primary and secondary positions, as seen in FIG. 6, is tilted at opposite sides respectively of a vertical plane 54 through the axis of the pivot 44, giving the latch handle an over center bias or tendency to remain in primary or secondary positions, as shown. In this regard, the inner terminal of each notch defines a stop surface to limit handle tilting in secondary position, and the clevis shoulder 55 limits handle tilting in primary position.

From the foregoing it is clear that the entire control as to selection of the thread diameter, and also as to locking of the chaser units in selected precision threading position, is governed by the swinging movement of the handle 41 about the pipe axis 24 and also about the axis of the pivot 44, imparting simplicity and positive action to the control. It also will be observed that means is provided for releasably mounting the assembly 19 so that the latch handle projects upwardly throughout its range of positions of swinging movement about these axes. Typically, the housing member 22 is provided with lugs 56 and 57 projecting at opposite sides thereof to transmit the weight of the assembly. The lug 57 carres a pin 58 releasably received into the bore opening 59 in the upright 60 of the structure 20. The lug 56 carries two oppositely projecting pins 61 adapted to seat downwardly against the upright 62 of the structure 20, after first inserting the pin 58 into the opening 59 of the upright 60. For this purpose, a hand grip is provided at 63 to be integral with the lug 56 for lifting the heavy assembly about the pivot pin 58. Accordingly, the assembly may be quickly removed from mounting condition in order to slip onto or off a long pipe projecting through the openings formed in the assembly.

Finally FIGS. 2, 5 and 7 indicate a lubricant duct 65 extending radially in the housing from the outer to the inner portion thereof and to communicate via a port 66 with the relief or clearance 67 formed in the ring 30. The port 66 is seen in FIG. 7 to communicate with the lower portion of this clearance whereby lubricant will rise therein to eventually discharge as shown by the arrows 68 into the opening receiving the pipe. Accordingly, the pipe will be lubricated at the point of precision threading during such threading. It will also be seen that the clearance 67 is formed in the upper portion of the ring so that as the latch handle and the body 28 are rotated throughout the range defined by the handle axes 70 and 71 in FIG. 7 the lubricant will spill downwardly over the pipe thread being cut.

Referring again to plate 50, it may be adjusted about the axis 24 in order to precisely set the plate notches 51 relative to the positions of the chasers 25 in order to accurately form the pipe threads. Thus, if the chasers wear, the plate 50 may be re-set to compensate for such wear, the adjustable fasteners 73 and grooves 74 in the plate permitting such adjustment, as seen in FIG. 3. This connection also facilitates substitution of other plates with different notch settings. Finally, it is noted that cylindrical work other than pipe may be threaded by the apparatus described herein, typical work including bolts, rods and the like.

I claim:

1. In pipe threading apparatus of the character described, an assembly including
    (a) a housing member forming a central through opening to receive pipe extending generally horizontally for rotation about a first axis,
    (b) a series of thread chaser units carried by the housing, said units disposed about said first axis for cutting presentment to the pipe,
    (c) a body member forming a pipe receiving opening and carrying a series of cams spiraling about said first axis and located to effect simultaneous inward advancement or outward retraction of said chaser units upon relative rotation of the housing and body members about said first axis, the body member carried on the housing member,
    (d) a latch including a handle carried to freely project outwardly away from said first axis at the exterior of said housing and body,
    (e) connecting means including a pivot connecting the latch to said body member for free and unrestricted rocking of the latch about a second axis and between a primary position in which said body member may be freely rotated relative to the housing member in response to force applied to the handle in a direction generally normal to the direction of handle rocking, and a limited number of secondary positions in each of which relative rotation of said members is blocked,
    (f) said handle in said primary and secondary positions being tilted at opposite sides of a vertical plane extending generally normal to said first axis and containing said second axis thereby to develop gravity bias acting to retain the handle in either of said positions, (g) indexing means carried by the housing member and forming a series of latch engagement shoulders spaced about said first axis to be selectively engaged by the latch in said secondary positions and disengaged by the latch in said primary position, the spacing of said shoulders being predetermined to correspond to the selected diameter pipe threads to be formed by said chaser units, (h) and means for supporting said housing member so that the latch handle projects generally upwardly in each of the primary and secondary positions to be assumed by the latch, said support means including a support pivot at one side of said first axis and a downwardly received holder at the opposite side of said axis to transmit the weight of said assembly, said holder being liftable to rotate the assembly upwardly about said support pivot, said holder and pivot being generally horizontally spaced apart.

2. Apparatus as defined in claim 1 in which said connecting means includes a clevis carried by the body member at the upper periphery thereof to overhang the housing member and support said pin above the housing member, the major length of the latch projecting outwardly beyond the clevis in said latch secondary position.

3. Apparatus as defined in claim 1 in which the latch includes a dog to selectively engage said shoulders, said shoulders limiting pivoting of the latch away from said plane in the latch primary position, said indexing means including a plate adjustably carried on the housing to present a series of dog receiving notches defining said engagement shoulders, said plate and said latch having interengageable stop surfaces to limit latch pivoting away from said plane in the latch secondary position.

4. Apparatus as defined in claim 1 in which the assembly includes a retainer annulus carried by the housing member and mounting the body member for rotation, said annulus and the housing member forming a lubricant delivery passage discharging toward said first axis and at said housing opening.

References Cited by the Examiner
UNITED STATES PATENTS

| | | | |
|---|---|---|---|
| 166,716 | 8/1875 | Nugent | 10—96 |
| 639,232 | 12/1899 | Harrington | 10—122 |
| 990,864 | 5/1911 | Hart | 10—122 |
| 1,758,973 | 5/1930 | Rasmussen | 10—106 |
| 2,224,691 | 12/1940 | Pealer | 10—89 |
| 2,885,698 | 5/1959 | Bjalme | 10—122 |

ANDREW R. JUHASZ, *Primary Examiner.*